United States Patent
Franke et al.

(10) Patent No.: US 9,071,865 B2
(45) Date of Patent: Jun. 30, 2015

(54) DOCKING STATION

(75) Inventors: Volker Franke, Apolda (DE); Michael Pauli, Leipzig (DE); Guido Richardt, Mühlhausen (DE); Daniel Schick, Erfurt (DE)

(73) Assignee: Novabase Digital TV Technologies GmbH, Munchen-Flughafen (DE)

( * ) Notice: Subject to any disclaimer, the term of this patent is extended or adjusted under 35 U.S.C. 154(b) by 523 days.

(21) Appl. No.: 13/034,437

(22) Filed: Feb. 24, 2011

(65) Prior Publication Data

US 2011/0255607 A1 Oct. 20, 2011

Related U.S. Application Data

(63) Continuation of application No. PCT/EP2009/006190, filed on Aug. 26, 2009.

(30) Foreign Application Priority Data

Aug. 27, 2008 (EP) ..................................... 08015136

(51) Int. Cl.
*H04N 11/02* (2006.01)
*H04N 21/418* (2011.01)
*H04N 21/4363* (2011.01)
*H04N 21/438* (2011.01)

(52) U.S. Cl.
CPC ..... *H04N 21/43632* (2013.01); *H04N 21/4183* (2013.01); *H04N 21/438* (2013.01)

(58) Field of Classification Search
None
See application file for complete search history.

(56) References Cited

U.S. PATENT DOCUMENTS

| | | | | |
|---|---|---|---|---|
| 5,685,314 A | * | 11/1997 | Geheb et al. | 600/513 |
| 2007/0028260 A1 | * | 2/2007 | Williams et al. | 725/31 |
| 2007/0252746 A1 | * | 11/2007 | Hoffert et al. | 341/158 |
| 2008/0247544 A1 | * | 10/2008 | Candelore et al. | 380/241 |
| 2009/0088104 A1 | * | 4/2009 | Cheng et al. | 455/130 |
| 2011/0099584 A1 | * | 4/2011 | Rodriguez | 725/51 |

FOREIGN PATENT DOCUMENTS

| | | |
|---|---|---|
| EP | 1631072 A1 | 3/2006 |
| WO | WO 02/35838 A1 | 5/2002 |
| WO | WO 03/094511 A1 | 11/2003 |
| WO | WO 03/107537 A2 | 12/2003 |
| WO | WO 2007/072211 A2 | 6/2007 |
| WO | WO 2009/014851 A1 | 1/2009 |

OTHER PUBLICATIONS

International Search Report for International Application No. PCT/EP2009/006190, dated Dec. 3, 2009, 3 pages.
International Preliminary Report on Patentability for International Application No. PCT/EP2009/006190, dated Mar. 1, 2011, 9 pages.

* cited by examiner

*Primary Examiner* — Dave Czekaj
*Assistant Examiner* — Leron Beck
(74) *Attorney, Agent, or Firm* — Brinks Gilson & Lione

(57) ABSTRACT

Docking station for a modular device for digital multimedia reception, in particular for digital television reception, for the detachable coupling of a device for decoding digital multimedia signals, wherein the docking station comprises a back end interface 480 with a first coupling area 481 a designed for the detachable coupling of an external back end assembly group 180, as well as an HDMI input interface 484 designed for the detachable coupling of an HDMI output interface of an external device for decoding digital multimedia signals 8.

13 Claims, 3 Drawing Sheets

DOCKING STATION

RELATED APPLICATIONS

The present patent document is a continuation of PCT Application Serial No. PCT/EP2009/006190, filed Aug. 26, 2009, designating the United States and published in English. The PCT application claims the benefit of the filing date of European Patent Application No. 08015136.8 filed Aug. 27, 2008. All of the foregoing applications are hereby incorporated by reference.

AREAS OF INVENTION

The present invention relates to a docking station, and in particular to a docking station for a modular device for digital multimedia reception, in particular for digital television reception.

SUMMARY OF INVENTION

The present invention provides a device for decoding and receiving digital multimedia signals or television signals.

According to an exemplary embodiment of the invention a docking station is provided for the detachable coupling of a device for decoding digital multimedia signals, wherein the docking station comprises a signal input interface for digital multimedia signals, a first front end assembly group designed for receiving digital multimedia signals, a back end interface with a first coupling area designed for the detachable coupling of an external back end assembly group, an HDMI input interface designed for the detachable coupling of an HDMI output interface of an external device for decoding digital multimedia signals, and an HDMI output interface designed for the detachable coupling of an external multimedia device.

For example, such a docking station makes it possible to detachably couple an external device for decoding digital multimedia signals to a docking station, for example in the form of an HD stick. The docking station can here serve as a kind of base station, which incorporates front end components that prepare an external HF signal via a tuner IC as well as demodulate it via a demodulator IC, so as to prepare signals for an externally provided back end assembly group. The external back end assembly groups can be coupled to the docking station via the back end interface. The high definition multimedia interface (HDMI) input interface can be used to return the digital multimedia signal decoded by the back end assembly group to the docking station, so as to then output it via an HDMI output interface to an external multimedia device, for example a television set. The docking station can here serve as a central module for a device for receiving and decoding multimedia signals or television signals, wherein this central modular unit offers the opportunity to incorporate or couple additional components, for example so as to reflect a technical advance or adjustment to local or regional markets. Similarly to a docking station for a computer, the wiring and ports for the individual components can hence be retained, while the external back end module, for example, can be decoupled from the docking station, e.g., so that it can be replaced or used directly in or on another multimedia device.

Another exemplary embodiment of the invention provides a docking station having a front end interface with a couplable area designed for the detachable coupling of a second, external front end assembly group, wherein the back end interface comprises a second coupling area designed for the detachable, loop-through coupling of the front end interface to an external back end assembly group.

In addition to a front end assembly group already present in the docking station, this makes it possible to couple an additional external front end assembly group, for example, which permits a design that complies with a different standard relative to reception signals, so that the proposed docking station enables the preparation of signal data of varying origin and standard by coupling an additional external front end assembly group. For example, a front end assembly group within the docking station can as a result be prepared for satellite reception, while data can be prepared via an external front end assembly group by way of cable or antenna reception. By simply changing out an external front end assembly group, it is further possible to use the existing docking station in regions or countries in which the prevailing standard is not compatible with the front end assembly group already present in the docking station.

An exemplary embodiment of the invention provides a docking station with a power supply for the docking station, wherein the back end interface comprises a coupling area designed for the detachable coupling of the power supply to a couplable external back end assembly group.

In this way, the docking station can be designed not just to supply power to itself, but rather also for supplying power to couplable external modules, such as a couplable device for a device for decoding digital multimedia signals, for example a back end assembly group, e.g., which can be provided as an HD stick. With respect to the power supply, the docking station can also be designed in such a way as to also supply power or energy to additional externally couplable components. In addition, the power supply of the docking station can also be coupled to a power supply bus, so that the latter corresponds with other power supply units of components to be coupled, for example, thereby making it possible to establish a redundancy in power supply.

An exemplary embodiment of the invention provides a docking station comprising a front end interface with a coupling area designed for the detachable coupling of an external power supply to the docking station, wherein the back end interface comprises a coupling area designed for the detachable, loop-through coupling of the external power supply to a couplable external back end assembly group.

In this way, the power supply for an external back end assembly group can be provided not just via the docking station, but also via an external couplable component that itself comprises a power supply. As a result, such a bus system provided in the docking station enables a distribution in the power supply via the docking station, even if the actual power supply in the docking station is not ready for this purpose or might not have sufficient capacities.

An exemplary embodiment of the invention provides a docking station with an operator panel, wherein the back end interface comprises a coupling area designed for the detachable coupling of the operator panel to a couplable external device for decoding digital multimedia signals.

In this way, a potentially larger operator panel, such as a keyboard or the like, can be provided in the docking station, making it possible to not just operate the components of the docking station, but also the components of a coupled component, such as a back end module.

An exemplary embodiment of the invention provides a docking station with a user interface designed for the detachable coupling of an external operator panel to the docking station, wherein the back end interface comprises a coupling area designed for the detachable, loop-through coupling of an external operator panel to a couplable external device for decoding digital multimedia signals.

This makes it possible to provide not just an operator panel belonging to the docking station, but also to couple an external, additional operator panel to the docking station, which in turn can be used not just as an operator panel for the docking station, but also for other coupled components. This external operator panel can comprise the same or similar control functions as those in the operator panel already provided internally in the docking station, but can also have additional, enhanced functions. Such an operator panel can take the form of wireless remote control or the like, for example.

An exemplary embodiment of the invention provides a docking station in which the user interface is an infrared interface.

This makes it possible to wirelessly couple additional control elements, for example, which can communicate with the docking station via specific transmission protocols, and can also consist of multifunction remote controllers available on the market in numerous variants owing to specific standards.

An exemplary embodiment of the invention provides a docking station in which the front end assembly group comprises a receiver for receiving digital multimedia signals and a demodulator for demodulating digital multimedia signals.

In this way, a receiver or tuner can be provided within the docking station, along with a demodulator, which eliminate the need for any further external coupling of an external front end assembly group.

An exemplary embodiment of the invention provides a docking station in which digital multimedia signals are digital television signals.

In this way, the docking station can be designed for a high definition (HD) television reception.

An exemplary embodiment of the invention provides a device for decoding digital multimedia signals with a back end assembly group designed for the data processing of digital multimedia signals, a front end interface with a first coupling area designed for the detachable coupling of a first external front end assembly group, and an HDMI output interface designed for the detachable coupling of a multimedia device.

This makes it possible to provide a device for decoding digital multimedia signals, which can be made compact in design since it can be coupled to an external front end assembly group, wherein the front end assembly group in turn can comprise a regional or market-dependent power supply or tuner and demodulator. The device for decoding digital multimedia signals can itself in turn be coupled to a multimedia device, for example an HDMI-capable television set with tube display or an HDMI-capable plasma or LCD display. However, a multimedia device can also be coupled via a docking station, for example, to which the device for decoding digital multimedia signals is coupled via an HDMI output interface, for example. In other words, an external multimedia device can be coupled either directly to the device for decoding digital multimedia signals, or via the docking station, wherein signal transmission then takes place via the docking station. A first coupling area of a front end interface makes it possible to couple a first front end unit to the back end assembly group.

According to an exemplary embodiment of the invention, the device for decoding digital multimedia signals comprises a second coupling area at the front end interface that is designed for the detachable coupling of a second external front end assembly group.

This makes it possible to couple not just one, but even two or more front end assembly groups to the back end assembly group, of which one front end groups is provided in a docking station, for example, to which the device for decoding digital multimedia signals is coupled. A second external front end assembly group can be coupled to the docking station, while the docking station comprises corresponding loop-through lines so as to also provide the signals of the second external front end assembly group via the corresponding second coupling area of the front end interface of the back end assembly group. In other words, the device for decoding digital multimedia signals is designed for the connection of several front end assembly groups, wherein the different coupling areas in one embodiment are provided in a front end interface, which permits easy coupling and decoupling to and from a docking station, without having to do without the convenience of several front end assembly groups.

An exemplary embodiment of the invention provides a device for decoding digital multimedia signals in which the front end interface comprises a coupling area for coupling an external power supply to the device for decoding digital multimedia signals.

This makes it possible to provide the device for decoding digital multimedia signals an input for a power supply, so as to supply the necessary energy to the device from outside without having to provide a power supply in the device itself, such as a power supply unit.

An exemplary embodiment of the invention provides a device for decoding digital multimedia signals with a user interface designed to enable data exchange between an external operator panel and the device for decoding digital multimedia signals.

This eliminates the need for an explicit operator panel on the device for decoding digital multimedia signals, without having to do without the ability to operate the device for decoding digital multimedia signals, since operation can take place via a corresponding interface, and corresponding control elements are provided, for example on a docking station to be coupled.

An exemplary embodiment of the invention provides a combination of the device for decoding digital multimedia signals and the docking station, wherein the device for decoding digital multimedia signals and the docking station each comprise matching plug-and-socket connections, and are directly coupled together, wherein the combination is designed as a set-top box.

In this way, combining the modular assembly groups, specifically the assembly group of the device for decoding digital multimedia signals and the assembly group of a docking station, provides the complete functionality of a set-top box, but without having to do without the capabilities offered by an expansion or enhancement of additional functions. The matched plug-and-socket connections ensure a direct coupling of the device for decoding digital multimedia signals and the docking station, making the integral unit available for the user without cumbersome additional cable connections. The plug-and-socket connections of a back end interface provided on a docking station can correspond to each other with the plug-and-socket connections of a front end interface provided on the docking station for the coupling of an external front end assembly group in such a way that the docking station can be used as a quasi intermediate coupling unit between an external front end assembly group and a couplable external back end assembly group. Contrarily, this makes it possible to couple the external front end assembly group directly to the external aback end assembly group when removing the docking station, to thereby provide a compact, modular direction for receiving and decoding multimedia signals, which can be limited to rudimentary functions without also incorporating the additional functionalities of the docking station. In this way, a relatively compact device can be provided in particular for cases in which the other functionalities can be eliminated, for example when traveling with the device.

An exemplary embodiment of the invention provides a device for receiving digital multimedia signals, with a signal input interface for digital multimedia signals, a front end assembly module designed for receiving digital multimedia signals, and a back end interface designed to be coupled to an external docking station. A separate, external front end assembly group or front end component can be provided in this way. The back end interface of the device for receiving digital multimedia signals can here be designed to correspond to the front end interface of the device for decoding digital multimedia signals in such a way as to eliminate the need for a docking station at this location, without losing the rudimentary or essential functions of a device for receiving and decoding multimedia signals.

An exemplary embodiment of the invention provides a combination of a device for receiving digital multimedia signals and a device for decoding digital multimedia signals, wherein the device for decoding digital multimedia signals and the device for receiving digital multimedia signals each comprise matching plug-and-socket connections, and are directly coupled together.

Let it be noted that individual features described above can of course also be combined with each other, also yielding in part advantageous effects going beyond the sum of individual effects. These and other aspects of the present invention are explained and illustrated through reference to the exemplary embodiments described below.

BRIEF DESCRIPTION OF DRAWINGS

Exemplary embodiments will be described below, drawing reference to the following drawings.

DETAILED DESCRIPTION OF EXEMPLARY EMBODIMENTS

Digital television receivers (DFEG) or digital multimedia receivers are predominantly realized as so-called set-top boxes (STB), which can be placed in proximity to a playback device as a separate accessory, for example a television. As a rule, a plurality of functional units is implemented in these set-top boxes (STB). A distinction is here essentially made between a front end module and back end module. For example, the front end module implements a tuner and demodulator. A demultiplexer, descrambler, programmable audio/video decoder, volatile user memory (RAM), and non-volatile program and data memory (NVRAM) are implemented in a back end module, for example. Also provided as a rule are a power supply, display and control elements and various ports. The display elements can here be LED's, infrared remote control receivers, card readers, keys, as well as numeric or alphanumeric displays. The provided ports can include a power supply port, a high-frequency input (HF) and, if necessary, an HF loop-through output as well as analog and/or digital video and audio outputs.

Several of the functionalities incorporated in the set-top boxes are mandatory for receiving digital multimedia signals or television signals, while other functionalities and components are not absolutely required for receiving signals, but rather constitute additional functionalities that enhance user comfort or expand the functionality of the set-top box to beyond what is necessary. In addition, set-top boxes have components that undergo strong continuous further development, so that some components are often rendered obsolete by technical advances, while other components remain able to handle their intended functionality over longer periods of time. Further, several components in a set-top box are subject to a certain adjustment to reflect the local or regional circumstances. Set-top boxes may be offered as integral units, which fail to provide some type of expansion or modularity to satisfy the mentioned requirements.

Figure 1:
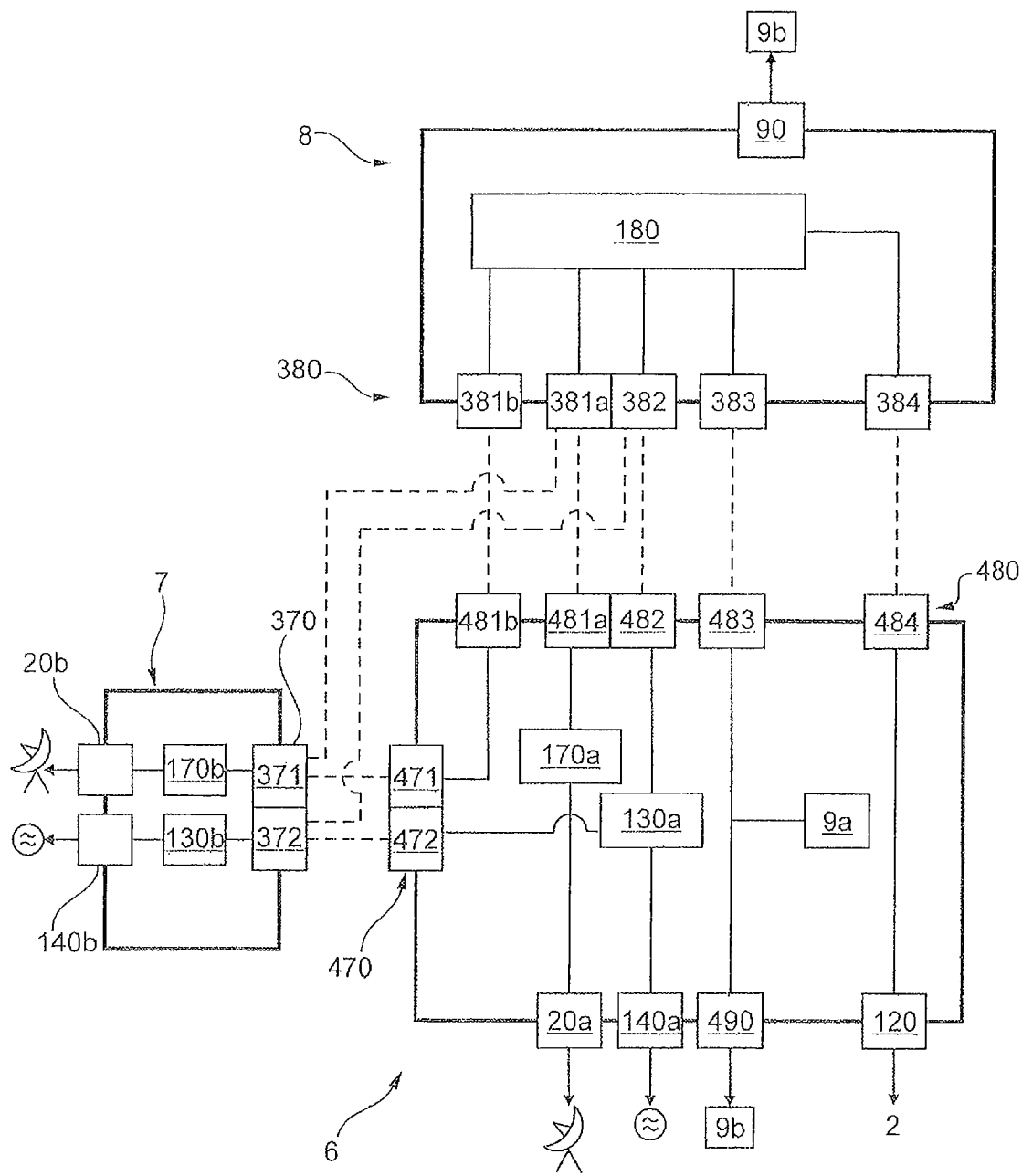
FIG. 1 shows the modular design and interaction between a docking device according to the invention, as well as a device for decoding digital multimedia signals and a device for receiving digital multimedia signals according to an exemplary embodiment of the invention.

FIG. 1 shows the modular design of a docking station 6, a front end unit 7 and a back end unit 8. Even though the components depicted here are shown as they functionally correlate with each other, the present invention also relates separately to the individual components of a docking station 6, a front end unit 7 and a back end unit 8.

The docking station 6 comprises a back end interface 480, which in the embodiment shown here permits a connection area 481a for coupling an internal, first front end assembly group 170a of the docking station to an external back end unit 8. Also provided is a second connection area 481b, which can be used to couple an externally couplable second front end unit 7 of a present front end assembly group 170b to the external back end assembly group as a second front end assembly group via a looped-through line or looped-through lines. The term "line" must also be understood to encompass a plurality of line strands or line elements, wherein both a unidirectional and bi-directional transmission of signals can take place. Of course, the signal can be amplified to maintain signal quality. In this way, the back end interface 480 can be provided with a coupling area 481a for an internal front end group in the docking station, and a second coupling area 481b for an externally couplable second front end assembly group 170b. In addition, the back end assembly group depicted in the embodiment shown on FIG. 1 comprises a coupling area 482 used to provide an internal power supply 130a in the docking station on the back end unit 8. For example, a power or energy supply bus system can be used to couple additional, external power supplies 130b, for example in a front end unit 7 to the energy supply bus system, for example via a coupling area 472 of a front end interface 470 of the docking station 6. The bus system can be used to couple the internal power supply 130a in the docking station to an energy supply system via a power supply port 140a. In addition, the back end interface 480 can be provided with a coupling area 483 for coupling an internal operator panel 9a in the docking station, or an external operator panel 9b couplable to the docking station, which can be coupled to the docking station via an interface 490. The back end interface in the embodiment shown on FIG. 1 also comprises a coupling area for an HDMI interface, with which an HDMI signal output by the back end unit 8 can be received, so as to relay this HDMI signal via an internal HDMI output interface 120 in the docking station to an external multimedia device 2. In this way, the docking station can use a single or several-part back end interface 480 to provide a complete supply coupling of a back end unit without having to establish additional lines or connections to the back end unit 8. The back end unit 8 can be a device for decoding digital multimedia signals, for example.

Even though the individual devices, the docking station 6, the device for receiving digital multimedia signals 7 and the device for decoding digital multimedia signals 8 are shown as they interrelate on FIG. 1, the subject matter of the application also relates to each of these devices separately, thereby providing modularity to a system for receiving and decoding digital multimedia signals. The device for decoding digital multimedia signals 8 comprises a back end assembly group 180, which is connected with the various coupling areas of a front end interface 380 in the device depicted on FIG. 1. The front end interface 380 here comprises a coupling area 381*a*, which corresponds with the accompanying coupling area 481*a* of the back end interface 480, so that this interface combination can relay signals from an internal front end assembly group 170*a* in a docking station to the back end assembly group 180 of the device for decoding digital multimedia signals or back end unit. Similarly, the front end interface 380 of the device for decoding digital multimedia signals 8 comprises a second coupling area 381*b* for coupling an external front end assembly group 170*b*. The external front end assembly group 170*b* can be coupled to the back end assembly group 180 via a corresponding coupling area 371 of a back end interface of an external receiver 7, a coupling area 471 of the front end interface 470 of the docking station 6 and a corresponding coupling area 481*b* of the back end interface 480 of the docking station 6. In this way, signals of varying front end assembly groups 170*a*, 170*b* can be sent to the back end assembly group 180 via the corresponding coupling areas 381*a* and 381*b*. In addition, the front end interface 380 comprises a coupling area 382 for coupling an external power supply to the back end assembly group 180. The external power supply can here be situated in a docking station 6 as the power supply 130*a*, but can also be arranged in another external front end unit or an external device for receiving digital multimedia signals 7 by way of a bus as a power supply 130*b*. In the latter case, coupling to the power supply bus system takes place via a bus and corresponding coupling areas 372 of the back end interface 370, the area 472 of the front end interface 470 of the docking station 6, and whatever other ports may be necessary (not shown here).

In addition, the front end interface 380 of the device for decoding digital multimedia signals 8 shown in the embodiment on FIG. 1 comprises a coupling area 383 that can be used to couple user functionalities. In this way, an appropriate corresponding coupling area 483 of the back end interface 480 of the docking station 6 can be used to couple controls 9*a* or 9*b* to the back end assembly group 180 of the device for decoding digital multimedia signals 8, so as not to have to provide any separate controls in the device for decoding digital multimedia signals 8. In addition, however, the device for decoding digital multimedia signals 8 can also be provided with its own user interface 90, which can be used, for example, to connect an external operator panel 9*b* via a remote or infrared connection. The front end interface 380 of the device for decoding digital multimedia signals 8 or back end assembly 8 further comprises a coupling area 384, via which HDMI signals of the back end assembly group 180 can be sent to the docking station 6, so as to then be relayed via the docking station 6 to a multimedia playback device 2. The interface areas 381*a*, 381*b*, 382, 383 and 384 of the front end interface 380 can here be designed in such a way that individual areas can also be coupled and decoupled. However, a single plug-and-socket connection can be provided for the entire front end interface 380 of the back end unit 8, so that a single plug-and-socket connection can be used to couple the back end unit 8 or device for decoding digital multimedia signals 8 to the docking station 6.

In addition to the back end interface 370 with a coupling are 371 for coupling a front end assembly group 170*b* to the docking station, the device for receiving digital multimedia signals 7 or front end unit 7 shown in the embodiment on FIG. 1 also comprises another coupling area 372, which can be used to set up a power supply from the front end unit to the docking station or vice versa. The power supply 130*b* can here be connected to an external power supply via a corresponding connection point 140*b*. In addition, a high-frequency (HF) connection device 20*b* can be provided to link the front end assembly group 170*b* with an HF signal source. Such an HF signal source can be a satellite signal, a cable signal or a signal from a terrestrial antenna, but is not limited to these signal sources.

Coupling to the front end interface 370 of the docking station with the coupling areas 471, 472 can take place via the back end interface 470 with the corresponding coupling areas 371, 372. However, the plug-and-socket connection of the back end interface 370 can be designed in such a way as to also correspond with the corresponding coupling areas 381*a*, 382 of the front end interface 380 of the back end unit 8, so that the front end unit 7 can also be directly combined with the back end unit 8, for example, when functionalities of the docking station 6 are not required.

Figure 2:
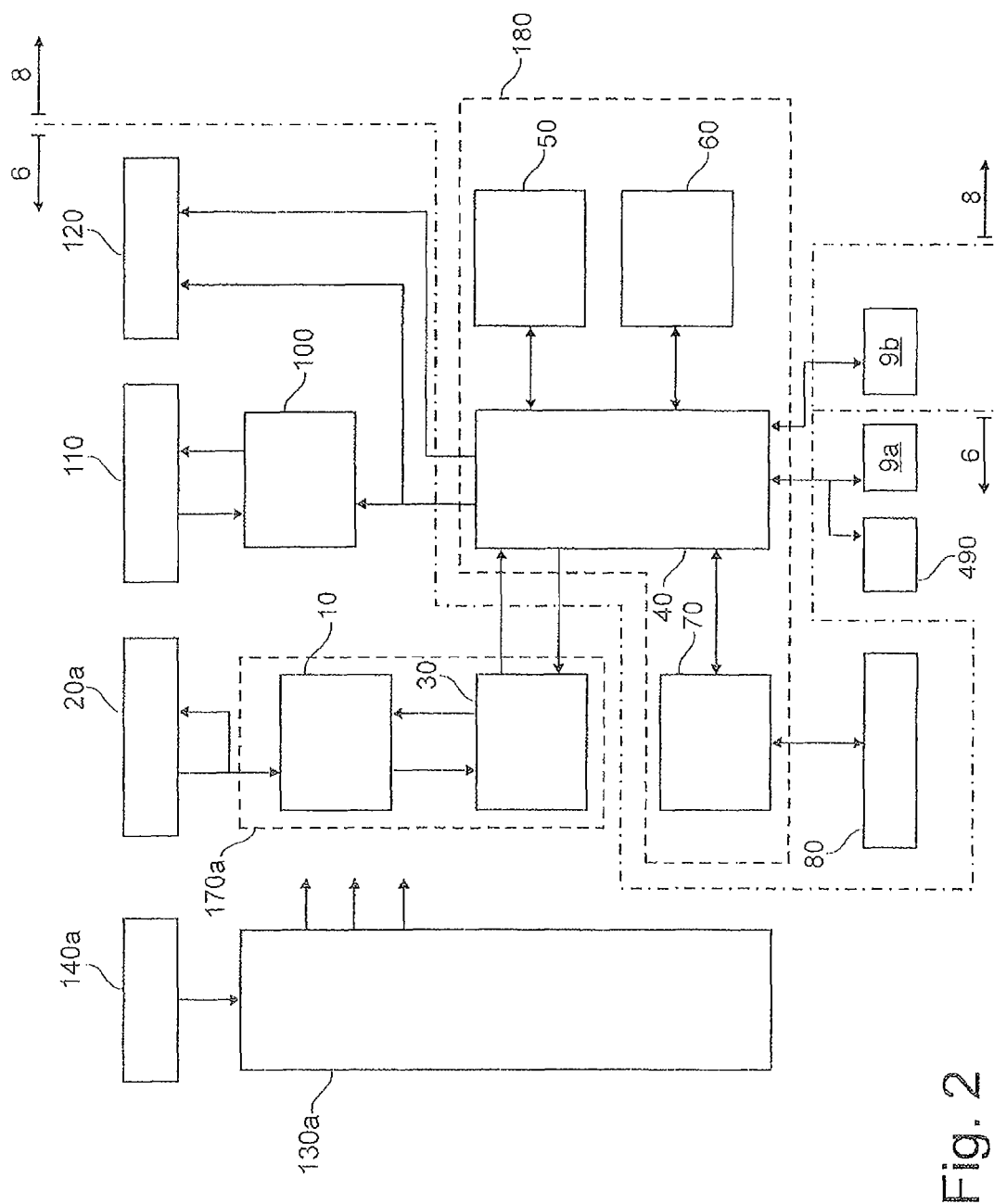
FIG. 2 shows a diagrammatic view of the interaction between various components relative to the docking device and the device for decoding digital multimedia signals according to an exemplary embodiment of the invention.

FIG. 2 shows a diagrammatic view of the functional correlations between various components of the docking station 6 or a device for decoding digital multimedia signals 8, as well as with external components thereof. The dashed line here shows the separation between the docking station 6 and the device for decoding digital multimedia signals 8. For example, the docking station 6 comprises a front end module 170*a* with a tuner IC 10 and a demodulator IC 30, which are coupled together for data exchange. In this embodiment, the demodulator IC 30 is used for coupling with the back end module 180 of the device for decoding digital multimedia signals 8 via the corresponding interfaces not denoted here in any greater detail. Further, the docking station is connected with a signal input interface 20*a*, by way of which input signals can be relayed to the front end module 170*a*, for example in the form of HF signals. In addition, a power supply 130*a* is provided with a power supply port 140*a*, which is used for supplying power to the components of the docking station 6. The other functional links are not shown in any detail in the diagrammatic view depicted on FIG. 2. In addition to the back end module 180, the device for decoding digital multimedia signals 8 also comprises a user interface 90 for control and display elements, for example, along with a port for a smart card 80, e.g., in the form of a smart card slot. Also provided is an output for connecting an HDMI-ready multimedia device 120. In addition, for example, a remodulator assembly group 100 can be provided, along with remodulator HF ports 110. For example, the back end module 180 can here comprise a back end processor IC 40, a RAM memory 50, a flash memory 60 and a smart card IC 70. The smart card IC can here be connected with the interface for the smart card 80, for example.

In the embodiment shown here, for example, the back end processor IC 40 can be connected to an operator panel 9*a* implemented in the docking station 6, but also to an external operator panel 9*b* that can be coupled by way of a user interface 90 not shown here. Additional controls can be coupled as needed via a user interface 490 provided in the docking station 6.

Figure 3:
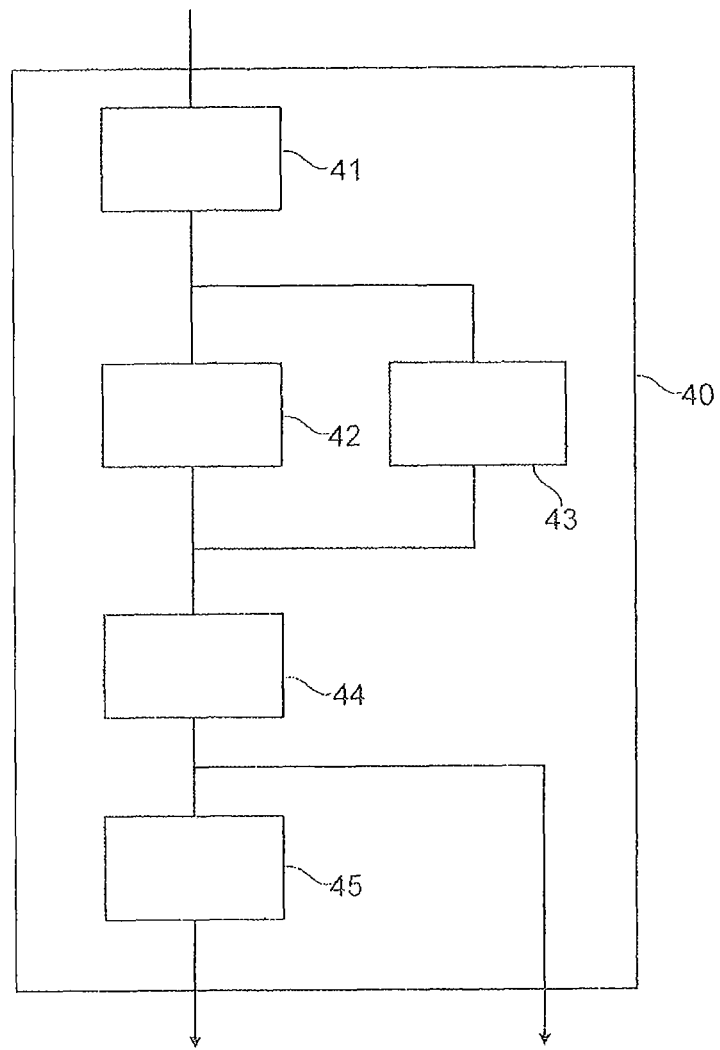
FIG. 3 shows an exemplary structure of a back end device or back end processor IC according to an exemplary embodiment of the invention.

FIG. 3 shows a more detailed diagrammatic view of a back end processor IC 40 according to an exemplary embodiment of the invention. For example, this back end processor IC can be provided with a demultiplexer 41, a descrambler 42 or a decryption device 43, an MPEG decoder 44 as well as an optional digital/analog converter 45. The digital/analog converter 45 is provided in particular for cases in which the signal output by the MPEG decoder is to be relayed to an analog-ready device. However, the digital/analog converter can also be circumvented if the connected multimedia device 2 is digital-ready. In one embodiment, for example, the signal fed into the data processor 40 is prepared by a demultiplexer 41 and descrambler 42 to isolate a signal for a channel. The channel-isolated signal can then be decrypted by a decryption device 43 and then MPEG decoded, thereby yielding a displayable television signal.

It should be noted that, in addition to receiving digital television signals, the present invention can also be used for receiving digital broadcast signals of any kind, in particular for any transmission of video and/or audio signals.

Let it be noted that the term "comprising" does not preclude other elements and procedural steps, just as the term "a" and "an" does not exclude several elements and steps. Also elements described in association with different embodiments may be combined. It should also be noted that reference signs in the claims shall not be construed as limiting the scope of the claims.

REFERENCE LIST

1 Device for receiving digital television signals
2 Multimedia device
6 Docking station
7 Device for receiving digital multimedia signals
8 Device for decoding digital multimedia signals
9a, 9b Operator panel
10 Tuner IC
20a, 20b HF signal ports
30 Demodulator IC
40 Back end processor IC
41 Demultiplexer
42 Descrambler
43 Decryption device
44 MPEG decoder
45 Digital/analog converter
50 RAM memory
60 Flash memory
70 Smart card IC
80 Smart card slot
90 Control and display element interface
100 Remodulator assembly group
110 Remodulator HF ports
120 RCA/Toslink audio and video outputs or HDMI interface
130a, 130b Power supply circuit
140a, 140b Power supply port
170a, 170b Front end module or assembly group
180 Back end module or assembly group
370 Back end interface, external receiver
371 Coupling area, data transmission back end interface
372 Coupling area, power supply back end interface
380 Front end interface, external decoder
381a, 381b Coupling area, data transmission front end interface
382 Coupling area, power supply front end interface
383 Coupling area, user interface
384 Coupling area, HDMI interface
470 Front end interface, docking station
471 Coupling area, data transmission front end interface
472 Coupling area, power supply front end interface
480 Back end interface, docking station
481a, 481b Coupling area, data transmission back end interface
482 Coupling area, power supply back end interface
483 Coupling area, user interface
484 Coupling area, HDMI interface
490 User interface, docking station

The invention claimed is:

1. A docking station for the detachable coupling of a device for decoding digital multimedia signals, the docking station comprises:
   a signal input interface for digital multimedia signals;
   an internal front end assembly group designed for receiving the digital multimedia signals from the signal input interface;
   a front end interface with a coupling area designed for detachable coupling of an external front end assembly group of an external front end device;
   a HDMI output interface designed for detachable coupling of an external multimedia device, the HDMI output interface configured to output an HDMI signal to the external multimedia device; and
   a back end interface designed for detachable coupling of an external back end assembly group of an external back end device configured to decode digital multimedia signals, the back end interface comprising: a first coupling area; a second coupling area; and a HDMI input interface,
   wherein the first coupling area of the back end interface of the docking station is designed for detachable coupling of the internal front end assembly group of the docking station to the external back end assembly group,
   wherein the second coupling area of the back end interface of the docking station is designed for detachable, loop-through coupling of the front end interface of the docking station to the external back end assembly group,
   wherein the HDMI input interface of the back end interface of the docking station is designed for the detachable coupling of the HDMI output interface of the docking station to an external HDMI output interface of the external device that is coupled to the external back end assembly group,
   wherein the external front end device, the external back end device, and the external multimedia device are different external devices, the docking station being a central module for the different external devices, and
   wherein the front end interface, the back end interface, and the HDMI output interface are different interfaces of the docking station, each designed for detachable coupling to a respective one of the different external devices.

2. The docking station according to claim 1, further comprising a power supply for the docking station; wherein the back end interface further comprises a third coupling area designed for the detachable coupling of the power supply to the external back end assembly group.

3. The docking station according to claim 1, wherein the front end interface further comprises a second coupling area designed for the detachable coupling of an external power supply to the docking station, wherein the back end interface further comprises a third coupling area designed for the detachable, loop through coupling of an external power supply to the external back end assembly group.

4. The docking station according to claim 1, further comprising an operator panel, wherein the back end interface further comprises a third coupling area designed for the detachable coupling of the operator panel to the external back end device.

5. The docking station according to claim 1, further comprising a user interface designed for the detachable coupling of an external operator panel to the docking station, wherein the back end interface further comprises a third coupling area designed for detachable, loop through coupling of the external operator panel to the external back end device.

6. The docking station according to claim 5, wherein the user interface is an infrared interface.

7. The docking station according to claim 1, wherein the external front end assembly group comprises a receiver for receiving digital multimedia signals and a demodulator for demodulating digital multimedia signals.

8. The docking according to claim 1, wherein the digital multimedia signals are digital television signals.

9. A set-top box for decoding digital multimedia signals, comprising:
   an external back end device for decoding digital multimedia signals; and
   a docking station for the detachable coupling of the external back end device for decoding digital multimedia signals, wherein the back end device is external the docking station, and wherein the docking station comprises:
      a signal input interface for digital multimedia signals;
      an internal front end assembly group designed for receiving the digital multimedia signals from the signal input interface;
      a front end interface with a coupling area designed for detachable coupling of an external front end assembly group of an external front end device;
      a HDMI output interface designed for the detachable coupling of an external multimedia device, the HDMI output interface configured to output an HDMI signal to the external multimedia device; and
      a back end interface designed for detachable coupling of an external back end assembly group of the external back end device configured to decode digital multimedia signals, the back end interface comprising: a first coupling area; a second coupling area; and a HDMI input interface,
   wherein the first coupling area is designed for detachable coupling of the internal front end assembly group to the external back end assembly group of the external back end device,
   wherein the second coupling area is designed for detachable, loop-through coupling of the front end interface to the external back end assembly group of the external back end device, and
   wherein the HDMI input interface is designed for the detachable coupling of the HDMI output interface of the docking station to an external HDMI output interface of the external back end device, the external HDMI output interface coupled to the external back end assembly group, and
   wherein the external back end device for decoding digital multimedia signals comprises:
      the external back end assembly group designed for the data processing of digital multimedia signals;
      an external front end interlace designed for detachably coupling of the back end interface of the docking station, the external front end interface comprising: a first coupling area, a second coupling area, and the external HDMI output interface;
   wherein, when the external front end interface of the external back end device is coupled to the back end interface of the docking station: the first coupling area, the second coupling area, and the external HDMI output interface of the external front end interface of the external back end device are respectively coupled with the first coupling area, the second coupling area, and the HDMI input interface of the back end interface of the docking station,
   wherein the external front end device, the external back end device, and the external multimedia device are different external devices, the docking station being a central module for the different external devices, and
   wherein the front end interface, the back end interface, and the HDMI output interface are different interfaces of the docking station, each designed for detachable coupling to a respective one of the different external devices.

10. The set-top box of claim 9, wherein the front end interface of the docking station further comprises a second coupling area for the releasable coupling of an external voltage supply to the external back end device for decoding digital multimedia signals via a third coupling area of the back end interface of the docking station.

11. The set-top box of claim 9, further comprising a control interface designed to enable a data exchange between an external control device and the external back end device for decoding digital multimedia signals, wherein the control interface is configured to be coupled with a third coupling area of the back end interface of the docking station.

12. The set-top box of claim 9, wherein the external back end device for decoding digital multimedia signals and the docking station have plug connections which fit one another in each case and are directly coupled to one another.

13. The set-top box of claim 9, further comprising the external front end device, wherein the external front end device comprises:
   a signal input interface configured to receive digital multimedia signals;
   the external front end assembly group; and
   a back end interface designed for detachable coupling to the front end interface of the docking station.

* * * * *

UNITED STATES PATENT AND TRADEMARK OFFICE
CERTIFICATE OF CORRECTION

| | | |
|---|---|---|
| PATENT NO. | : 9,071,865 B2 | Page 1 of 1 |
| APPLICATION NO. | : 13/034437 | |
| DATED | : June 30, 2015 | |
| INVENTOR(S) | : Volker Franke et al. | |

It is certified that error appears in the above-identified patent and that said Letters Patent is hereby corrected as shown below:

In the Claims

In column 12, claim 9, line 8, after "external front end" replace "interlace" with --interface--.

Signed and Sealed this
Fifth Day of January, 2016

Michelle K. Lee
*Director of the United States Patent and Trademark Office*